Figure 1:
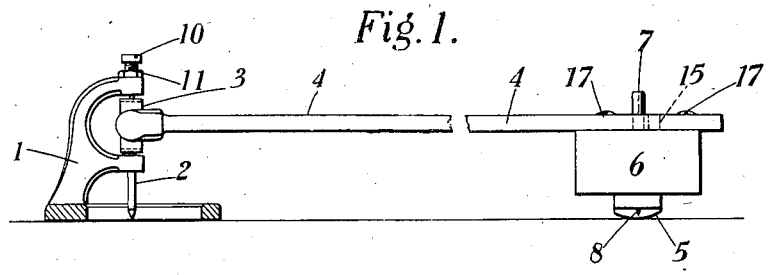
Figure 2:
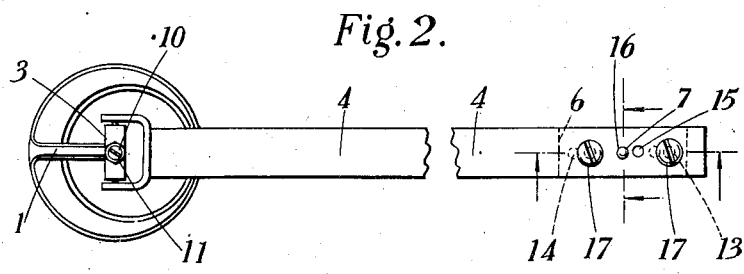
Figure 3:
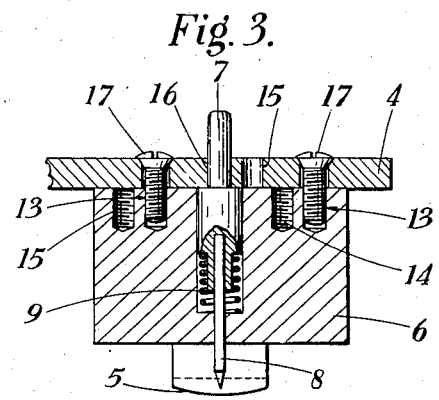
Figure 4:
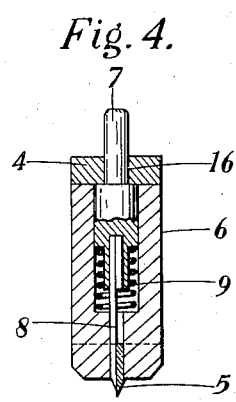
Figure 5:
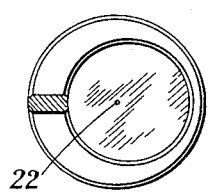

Jan. 15, 1935.  L. H. HOUNSFIELD  1,988,357

PLANIMETER

Filed Oct. 27, 1932

INVENTOR,
L. H. HOUNSFIELD.
BY
ATTORNEYS.

UNITED STATES PATENT OFFICE 1,988,357

PLANIMETER

Leslie Haywood Hounsfield, Wimbledon, London, England

Application October 27, 1932, Serial No. 639,916
In Great Britain October 28, 1931

8 Claims. (Cl. 33—122)

The present invention relates to improvements in or relating to planimeters and more particularly to planimeters of the type known as "hatchet" planimeters wherein the shaft or stem of the instrument has at one end a point which is caused to follow the boundary of the area to be measured and at the other end which is weighted a hatchet like edge or wheel hereinafter called the blade which permits movement over the paper freely in the direction of its edge but resists movement in any other direction. Thus movements of the blade are limited to the direction of the line joining the blade and the point towards and away from the point. It will be understood that the instrument is used to measure areas on substantially horizontal planes and that the point lies in the plane of the blade.

These instruments as at present constructed are subject to various disadvantages. In the first place it is difficult to maintain the instrument vertical during the tracing of a curve. Furthermore there is a tendency, when guiding the point over the curve to impose lateral forces on the blade thus causing it to travel sideways across the paper. Also when using these instruments it is necessary to exert vertical pressure on the blade to mark lines on the paper at the beginning and end of the operation of measuring an area, and subsequently to measure the distance apart of the lines. As the lines will be in general inclined, the measurement of their distance apart gives rise to difficulties. For these reasons the instruments of the type referred to at present known are liable to various inaccuracies in operation.

It is an object of the present invention to provide an improved planimeter having means for preventing it from leaning sideways when in use.

It is a further object of the invention to provide an improved planimeter in which the tracing point can be freely moved by the operator without any danger of his exerting lateral forces on the blade.

It is a further object of the invention to provide a planimeter of the type referred to, in which the tracing point is mounted on a carriage which can be freely traversed over the paper and which has a universal connection with the shaft or stem of the instrument.

It is a further object of the invention to provide an improved planimeter of the type referred to having means for accurately marking the initial and final positions of the blade when using the instrument.

It is a further object of the invention to provide an improved planimeter of the type referred to having means for setting the length of the stem to two or more predetermined values so that the instrument may give results suitable for more than one unit of dimensions.

Another object of the invention is to provide an improved planimeter having gimbals or the equivalent between the tracing point and the stem, the centre of the gimbals being maintained substantially in the same vertical line with the tracing point.

A further object of the invention is to provide an improved planimeter which though cheap to produce, easy to manipulate and not readily deranged will give results sufficiently accurate for most purposes.

In order that the invention may be well understood a preferred embodiment thereof will now be described by way of example only with reference to the accompanying drawing:—

In the accompanying drawing Fig. I represents an elevation of one form of the instrument and Fig. II represents a plan.

Fig. III is an enlarged section of the blade end and Fig. IV represents a transverse section through Fig. III viewed in the direction of the arrow 12.

Fig. V is a plan view of the lower portion of a modified form of base.

The following description indicates one way only of carrying out this invention and in this description the same numbering applies to all the figures.

An open-work frame 1 with a smooth flat ring-shaped base can slide freely over the paper, this frame carries a pointer 2, the point of which just clears the paper. 3 is a universal joint or gimbal mechanism or the equivalent which allows the shaft 4 to move freely sideways and up and down but prevents rotation which would cause the blade to lean.

At the other end of the shaft 4 is a weight 6 which is connected to the shaft 4 by means of screws 17 which pass through holes in the shaft and engage in threaded holes 13, 13, or 14, 14 in the weight 6 so that the weight can be mounted on the shaft in either of two positions. The weight 6 carries the blade 5 which is pressed against the paper by the weight 6. A push 7 which passes through a hole 16 or 15 in the shaft 4 according to the position of the weight 6, is connected to a needle 8 the point of which is normally held just clear of the paper by the spring 9.

In Figs. III and IV it will be seen that the blade is flat on one side and bevelled on the other, similarly the needle is made of half round material i. e. semi-circular in section right to the point.

In this way the needle point and the blade practically coincide. As Fig. III is a mid-section the needle 8 should not appear—strictly speaking—in this view.

The gimbal member 3 consists preferably of a thin ring of springy material with four small holes drilled at right angles to one another in a plane at right angles to the axis of the ring.

This construction enables all the four points or centres of the joint to be adjusted to their proper tension and free from shake by screwing one point or centre in or out by the screw 10 which can be locked with the nut 11.

The method of operation is as follows:—

Presuming that the paper containing the area to be measured is secured to the drawing board in the ordinary manner, the centre of gravity of the area is estimated and a line is drawn from this point to a boundary line of the figure.

The point of the pointer 2 is started at this estimated centre of gravity with the blade 5 resting on a smooth piece of paper—such hard surfaces as glass or surfaces of varying hardness such as wood are unsuitable—and the push 7 is depressed.

The frame 1 is then moved so that the pointer travels along the line to the boundary, all round the boundary and back along the line to the starting point when the push 7 is again depressed.

The distance apart of the two punctures thus made, when multiplied by a suitable constant, gives the area of the figure.

As the point of the pointer 2 is held just clear of the paper by the frame 1 it can be quite sharp instead of being ball pointed as is usual.

Instead of an actual pointer a spot 22 or "crosslines" may be marked on a celluloid or transparent base in the same vertical axis as the gimbal joint or pivots 23 as shown in Fig. V.

If the outside of the base is circular and concentric with the tracing point or spot, then the latter may be caused to move in a straight line where required by moving the frame in contact with a straight edge and similarly the point may be caused to move in a predetermined curve if the frame is moved in contact with a suitably curved edge.

The foregoing description is by way of example only and it will be obvious that details may be varied in accordance with various well known methods, also the length of the stem 4 may be either adjustable to any length within limits or may be capable of being set to two or more definite positions for specific purposes.

For example if the virtual length is 4 inches then, a distance apart of the dots puncturing the paper of ¼ inch will denote an area of 1 square inch and if the virtual length is reduced to 10 centimetres then a distance apart of the dots of 1 millimetre will indicate an area of 1 square centimetre.

I claim:

1. A planimeter comprising a stem weighted at one end, a blade at the said end of said stem, a bifurcated bracket at the other end of said stem, a ring pivotally supported in said bracket about an axis at right angles to said blade, a carriage pivotally secured to said ring about an axis perpendicular to said first axis, a tracing point carried in line with said second axis, the said carriage having a flat base at right angles to said second axis and the tracing point being disposed very slightly above the lower surface of said base.

2. A planimeter comprising a stem weighted at one end, a blade at the said weighted end, a carriage at the other end of said stem, a universal connection between said carriage and said stem, a tracing point carried by said carriage and a vertically movable pricker adjacent the centre of said blade.

3. A planimeter comprising a stem, a weighted block adjustably secured adjacent one end of said stem, a blade carried by said block and adapted to contact with the surface over which the planimeter is to be moved, a carriage connected by means of gimbals to the other end of said stem and adapted to be traversed over said surface and a tracing point carried by said carriage.

4. In "hatchet" planimeters, a stem weighted at one end, a blade at the said end of the stem, a carriage at the other end of the stem, a flat base to said carriage, a tracing point within the base of said carriage, and gimbals connecting the carriage to the stem, the center of the gimbals being in a line through the tracing point at right angles to the base of the carriage.

5. In "hatchet" planimeters, a stem weighted at one end, a blade at the said end of the stem, a bifurcated bracket at the other end of said stem, a flexible ring pivotally supported in said bracket about an axis at right angles to said blade, a carriage pivotally secured to said ring about an axis at right angles to said first axis, and a tracing point carried by said carriage in line with said second axis, one of the pivot points of said carriage comprising an adjusting screw for adjusting all four pivot points of the gimbal joint simultaneously.

6. A "hatchet" planimeter comprising a stem weighted at one end, a blade at the said end of the stem, a carriage at the other end of said stem, a universal connection between said carriage and said stem, a tracing point carried by said carriage, a vertically movable pricker adjacent the center of said blade, and yieldable means for normally holding the pricker in raised position.

7. A "hatchet" planimeter comprising a stem weighted at one end, a blade at said weighted end, said blade being sharpened by being bevelled on one side only, a carriage at the other end of said stem, a universal connection between said carriage and said stem, a tracing point carried by said carriage and a vertically movable pricker adjacent the center of said blade, the said pricker being semicircular in cross section and the flat side of the pricker being against the flat unbevelled side of the blade.

8. In "hatchet" planimeters, a stem weighted at one end, a blade at the said end of the stem, a gimbal member at the other end of said stem and pivoted thereto about an axis at right angles to the plane of the blade, a carriage pivotally connected to said gimbal member about an axis at right angles to said first axis and in the plane of the blade, and a tracing point carried by said carriage in line with said second axis.

LESLIE HAYWOOD HOUNSFIELD.